United States Patent
Kim et al.

(10) Patent No.: US 11,722,073 B2
(45) Date of Patent: Aug. 8, 2023

(54) FLOCKED SURFACE TRIBOELECTRIC CHARGE GENERATOR AND METHOD OF MANUFACTURING

(71) Applicant: University of Massachusetts, Boston, MA (US)

(72) Inventors: Yong K. Kim, North Dartmouth, MA (US); Armand F. Lewis, Mattapoisett, MA (US)

(73) Assignee: University of Massachusetts, Boston, MA (US)

( * ) Notice: Subject to any disclaimer, the term of this patent is extended or adjusted under 35 U.S.C. 154(b) by 924 days.

(21) Appl. No.: 16/656,668

(22) Filed: Oct. 18, 2019

(65) Prior Publication Data
US 2020/0127585 A1 Apr. 23, 2020

Related U.S. Application Data

(60) Provisional application No. 62/747,709, filed on Oct. 19, 2018.

(51) Int. Cl.
*H02N 1/04* (2006.01)
*D06N 7/00* (2006.01)

(52) U.S. Cl.
CPC ............ *H02N 1/04* (2013.01); *D06N 7/0097* (2013.01); *D06N 2209/041* (2013.01)

(58) Field of Classification Search
CPC ... H02N 1/04; D06N 7/0097; D06N 2209/041
See application file for complete search history.

(56) References Cited

U.S. PATENT DOCUMENTS

| | | | | |
|---|---|---|---|---|
| 9,985,554 | B2 * | 5/2018 | Wang | H02N 1/04 |
| 10,749,447 | B2 * | 8/2020 | Zhi | H02N 1/04 |
| 2015/0061460 | A1 * | 3/2015 | Bae | H02N 1/04 977/948 |
| 2016/0302507 | A1 * | 10/2016 | Lewis | B32B 3/085 |
| 2019/0379300 | A1 * | 12/2019 | Cao | H01L 41/0533 |
| 2020/0106371 | A1 * | 4/2020 | Xiong | D06M 11/83 |

FOREIGN PATENT DOCUMENTS

KR 20160027304 A * 3/2016 ............... H02N 1/04

OTHER PUBLICATIONS

Wang, et al., "Progress in triboelectric nanogenerators as a new energy technology and self-powered sensors", Energy Environ. Sci., 2015, 8, 2250, Received May 17, 2015, Accepted Jun. 18, 2015, pp. 2250-2282.

(Continued)

*Primary Examiner* — Thomas Truong
(74) *Attorney, Agent, or Firm* — Armis IP Law, LLC

(57) ABSTRACT

A flocked surface tribo-electric charge generator includes first and second contact surface electrodes; first and second flock fiber support layers a first flock fiber material flocked onto the first flock fiber support layer; a tribo-electrically second different flock fiber material flocked onto the second flock fiber support layer. A tribo-electric charge is generated by intermittent intermeshing/separation of the tribo-electrically diverse flock fiber materials of the first and second flock fiber support layers.

19 Claims, 9 Drawing Sheets

(56) References Cited

OTHER PUBLICATIONS

Gu, et al., "Triboelectric Nanogenerator Enhanced Nanofiber Air Filters for Efficient Particulate Matter Removal", ACS Nano, 2017, pp. 6211-6217.
Wang, et al., "Toward the blue energy dream by triboelectric nanogenerator networks" J. Nano Energy,39 (2017) 9-23 http;//dx.doi.org/10.1016/j.nanoen.,2017.06.035, pp. 1-15.
https://www.econotimes.com/400-Million-Triboelectric-Energy-Harvesting-TENG-Market-Analysis-Forecasts-2017-2027-562969; . Accessed Feb. 23, 2020.

* cited by examiner

DC Voltage Stored in the 100 uF Capacitor as a Function of Time at 1850 CPM.

FLOCKED SURFACE TRIBOELECTRIC CHARGE GENERATOR AND METHOD OF MANUFACTURING

RELATED APPLICATIONS

This application claims the benefit of U.S. Provisional Application No. 62/747,709, entitled FLOCKED SURFACE TRIBOELECTRIC CHARGE GENERATOR AND METHOD OF MANUFACTURING, filed Oct. 19, 2018 which application is hereby incorporated herein by reference in its entirety.

FIELD OF THE INVENTION

The invention relates to flocked fabrics for generating an electric charge.

BACKGROUND

Tribo-electric charge generation is a physical phenomenon that occurs when two solid material substances are physically contacted or frictionally rubbed together under usually dry to somewhat dry conditions. Here, a charge separation occurs presumably by electrons (negative charge particles) that are rubbed off the surface of one material and are deposited onto the other material. Under these conditions, an electrical charge separation occurs leading to an electrical potential difference (voltage) between the two electrodes associated with the two surfaces. Tribo-electrical energy is harvested from the electrical charges tribo-electrically induced in this "capacitor." From the standpoint of materials, it is known that all solids have a propensity for giving up frictional electrons when rubbed or physically contacted. However, for some solid materials the electrons are more easily rubbed or contacted off than others. To this end, a Tribo-electric Series of materials exists whereby various materials are listed according to their ease of giving up their surface electrons. A brief list of these materials is presented below:

Tribo-Electric Series
Propensity for Collecting a Negative Charge (−)
  PTFE (Teflon®)
  Silicone
  Polyimide fibers and films
  Polyester (PET) fibers and films
  Styrene and Polystyrene
  Acetate Rayon
  Brass
  Wood
  Steel
  Polymethylmethacrylate (PMMA)
  Wool
  Cotton
  Paper
  Silk
  Leather
  Glass
  Acrylic
  Nylon fibers or films
  Hair
  Polyurethane Foam
Propensity for Collecting a Positive Charge (+)
This list serves as a materials guide to the tribo-electric effect, namely, the further apart the two rubbing materials are in this series table, the greater the ease the two rubbing materials will have in generating an electric charge.

While, tribo-electronics is only a small part of the energy harvesting market (projected to be 7 billion by 2027), the field of harnessing and storing generated tribo-electric energy is in its infancy. Tribo-electric energy harvesting research programs vary from tribo-nanogenerators (TENGs) at micro-watt to milliwatt generators produced using the rubbing together of organic materials. It is also predicted that tribo-electric generators capable of producing hundreds of watts of energy are possible by converting the tribo-energy generated in automobile tires during their functional operation. For example, connecting this energy to a charge-traction battery can provide an energy regeneration source for electric automobiles.

SUMMARY

Tribo-electric energy generation is an ancient electrical phenomenon. However, practical applications for tribo-electricity are just now emerging. Over the past few years, tribo-electric signals have been adapted to power "smart textile", wearable technologies that harvest energy from human motion; e.g. from walking or other everyday movements. Tribo-electric devices are also being used to harvest energy from a vehicle's movement and vibration. Overall, the commercial success of applying tribo-electric phenomenon depends on the effectiveness of the tribo-electric material system used. Of Importance is how much power (wattage) these material systems can generate and how quickly the tribo-energy can be generated (Time Constant). Among reported application-functions under development for tribo-electrical energy generation are powering Liquid Crystal Display (LCD) screens or Light Emitting Diodes (LED) for lighting; activating keyless entry systems for homes or automobiles, development of health-condition monitoring self-powered wearable devices ("smart" clothes). The advantages of Flocked Surface Tribo-electric Generation (FSTG) technology for power generation are its low cost and ability to effectively collect tribo-energy over large areas.

In one embodiment, a flocked surface tribo-electric generator includes first and second electrodes, first and second flock fiber support layers conductively connected to respective ones of the first and second electrodes, a first flock fiber material flocked onto the first flock fiber support layer, a second different flock fiber material flocked onto the second flock fiber support layer; and wherein the first flock fiber support layer and the second flock fiber support layer are configured to generate electrical energy by generating friction contact between the first flock fiber material and the second different flock fiber material by contacting and fully separating the first flock fiber material to and from the second different flock fiber material. In one embodiment the first and second electrodes include conductive fabrics, conductive films or conductive composite membranes.

In operation, one embodiment of the present invention includes the process of rubbing intermeshing by forcing together of two flocked surfaces vertically to ensure that fiber lateral surfaces are in contact, one Polyester or Polyimide fiber flocked surface and the other a nylon fiber flocked surface. Nylon fibers have a more positive tribo-electric charge propensity in the tribo-electric series flock and Polyester and Polyimide fibers have a more negative charge propensity in the tribo-electric series. In this embodiment Nylon flock fibers are the first flock fiber material, and the second different flock fiber material in the tribo-electric series of flock fibers is either Polyethylene terephthalate (PET) fiber or polyimide fiber material. From this preknown factor, one would expect that rubbing/sliding/stroking or vertical contact (up and down separation/contact interpenetration) of these two flocked surfaces or the sliding contact between these two (far apart in the tribo-electric series) fiber types, a tribo-charge could be easily generated. While nylon and polyester fibers are used in one embodiment, other combinations of two fiber types that can be flocked on surfaces and are far apart in this tribo-electric series and rubbed together would be candidates to implement the practice of this invention (e.g., flocked surfaces of nylon and Acetate Rayon coupled to flocked surfaces of Polyester, Polyimide and Acrylic fibers).

In another embodiment the flocked surface tribo-electric generator further includes at least one elastic spacer disposed for cyclically separating the first flock fiber material from the second different flock fiber material. In a further embodiment, the contacting and separating and substantially in a vertical plane perpendicular to flocked surfaces of the first and second flock fiber support layers. In other embodiments the at least one elastic spacer can be disposed between the first flock fiber material and second different flock fiber material or the at least one elastic spacer can be disposed adjacent the first electrode and the second electrode. In yet another embodiment, the elastic spacer includes a flexible, recoverable spring which includes an elastomeric foam, a reticulated foam structure, an elastomeric mesh or a corrugated plastic strip material. In one embodiment the elastic spacer is electrically insulating (i.e., nonconductive).

In another embodiment, the first flock fiber material includes flock fiber material having a more positive tribo-electric charge propensity rated position in a tribo-electric series than the second different flock fiber material in the tribo-electric series of textile fibers. In a further embodiment, the more positive tribo-electric charge propensity in the tribo-electric series flock fibers includes Nylon flock fibers and the second different flock fiber material in the tribo-electric series flock fibers includes one of Polyethylene terephthalate (PET) fibers and polyimide fibers. In one embodiment, the contacting and separating is substantially in a horizontal plane parallel to a surface of the first and second flock fiber support layers. In another embodiment, in at least one of the first flock fiber material and the second different flock fiber material comprises a plurality of fibers having a fiber denier in a range of about 0.5 to about 200 denier, a fiber length of about 0.5 mm to about 5 mm, and a fiber flock areal density of about 5 fibers/mm$^2$ to about 300 fibers/mm$^2$. In another embodiment, at least one of the first flock fiber material and the second different flock fiber material comprises a plurality of fibers having a multi-lobal shape. In still another embodiment, the first and second flock fiber support layers include a polyester woven fabric, a Polyimide woven fabric, a thin polymeric film, a thin polymeric film coated fabric, a thin nonwoven fabric, a foam layer, a knitted fabric, a woven fabric, warp knitted fabric (WKF), a polyester WKF, a Polyimide WKF, a Weft knitted fabric, a para-polyaramid fabric (Kevlar®), a meta-polyaramid fabric (Nomex®), a glass fabric, a polybenzimidazole (PBI) fabric or a felt layer. In another embodiment, one of the first and second flock fiber support layers includes a nonwoven dielectric fabric. In another embodiment, a portion of one of the first flock fiber material and the second different flock fiber material are post-coated with a polytetrafluoroethylene (PTFE) finish or a polydimethoxysilonane (PDMS) (silicone) finish. In still another embodiment, the first and second electrodes include electrodes including a conductive fabric, a conductive film, a conductive plate or a conductive composite membrane.

A technique for generating energy from a flocked surface tribo-electric generator includes providing a flocked surface tribo-electric generator including first and second electrodes, first and second flock fiber support layers conductively connected to respective ones of the first and second electrodes, a first flock fiber material flocked onto the first flock fiber support layer and a second different flock fiber material flocked onto the second flock fiber support layer. The technique further includes generating a tribo-electric charge by: intermeshing the first flock fiber material and the second different flock fiber material; and separating the first flock fiber material from the second different flock fiber material and storing the generated tribo-electric charge in an energy storage device. Such a technique facilitates the ability to effectively collect tribo-energy over large areas.

In a further embodiment, frictional contact between the first flock fiber material and the second different flock fiber material is generated by horizontal motion including intermeshing, rubbing, sliding or stroking. In still another embodiment, the flocked surface tribo-electric generator further comprises an elastic spacer disposed to separate the first flock fiber material from the second different flock fiber material, applying a force to at least one of the first and second flock fiber support layers to compress the elastic spacer while intermeshing the first flock fiber material and the second different flock fiber material, and removing the force to allow the elastic spacer to separate the first flock fiber material and the second different flock fiber material. In yet another embodiment, the a first flock fiber material inter-meshes or penetrates the second different flock fiber material from 1% to 98% of the length of the flocked fibers before the first and second different flock fiber materials are fully separated.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein:

DETAILED DESCRIPTION

Figure 1A:
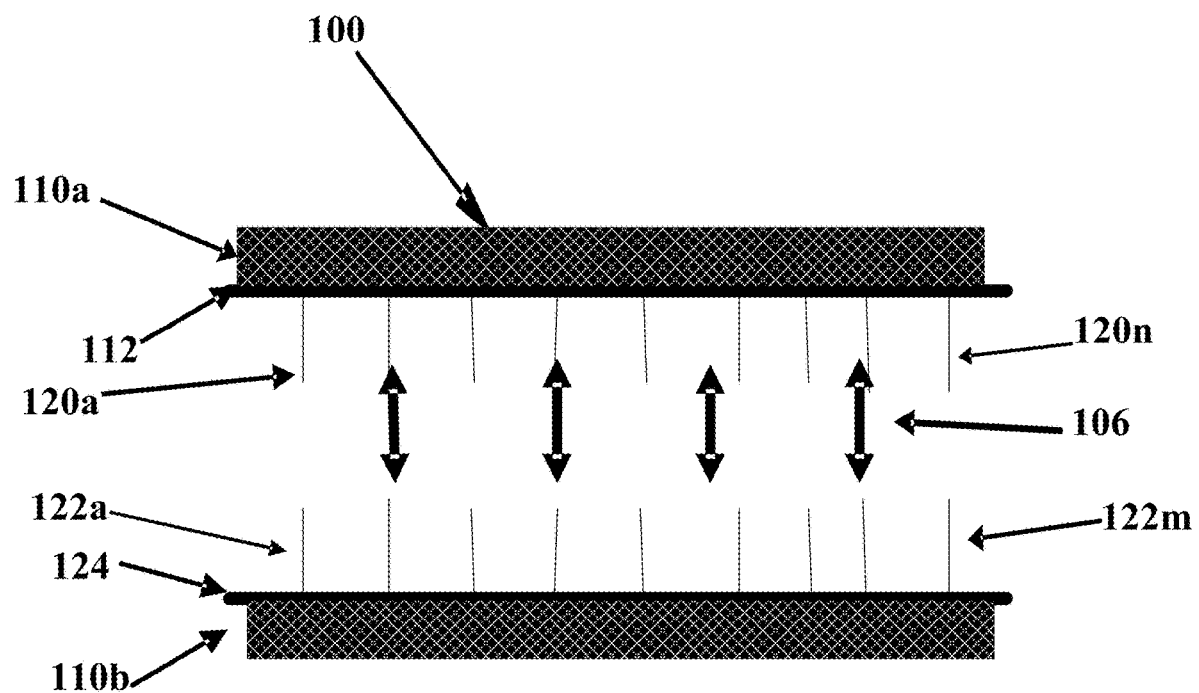
FIG. 1A is a schematic diagram of a Striking/Separation of the Flocked Surface (Nylon/polyester fibers) Tribo-Electric Generator (FSTG) functioning in the Vertical Contact-Separation Mode in accordance with one example embodiment disclosed herein.

Two synthetic textile fiber materials (Polyester and Nylon) have been highlighted in the above Tribo-Electric Series list. These are the two materials that can be used effectively in embodiments described below. In another embodiment a Flocked Surface Tribo-electric Generator (FSTG) is enabled by the rubbing action between Polyester fiber and Polyurethane Foam. In this embodiment, a flocked surface rubs or touches/penetrates/contacts an open or closed cell and/or reticulated foam surfaces. Tribological contact of fiber flocked surfaces against other forms of high-nap textile surfaces such as suede, velvet, highly napped fabrics, felt, velour and carpet-pile surfaces are also potential coupling materials for FSTG embodiments.

These embodiments provide a low-cost means of effectively converting mechanical to electrical energy by generating electricity by tribo-electrically rubbing/intermittent compressional tribo-coupled special flocked fiber surfaces. The Flocked Surface Tribo-Electric Generator (also referred to as Flocked Surface Energy Generator or Flocked Surface Charge Generator) can be used in designing and constructing a modular device that can be retrofitted to new or existing Wind Turbine energy generators or used in Ocean Wave ("blue energy") energy to electricity conversion and storage application devices. Effective, FSTG pad designs/ elements are now under study that could readily be applied to creating a very effective and efficient (modular) mechanical to electrical energy conversion devices. The modular FSTG devices could then be easily adapted to being activated into a reciprocating action by a rotating wind turbine. The so-generated electrical energy could then be stored in a rechargeable batteries or super capacitors. The stored electrical energy can then be fed directly into the electrical power grid supplementing and thereby improving the turbine's electromagnetic generator's output. Additional potential applications for FSTG technology include FSTG tribo-electric transducer devices for mounting onto military transportation vehicles. Here, road terrain induced mechanical bounce and vibration could be converted into tribo-electrical energy that could be suitably stored for external use or else to enhance the vehicle's electrical system as a power feed-back storage system. Also, self-sustaining LED lighted walkways; and human powered personal emergency lighting devices, smart and sustainable mechanical to electrical energy conversion devices for powering radio frequency personal identification equipment, remote health monitoring electronics and wearable biosensors networks (WBSN) are also potential applications. Of value too is that these FSTG material systems could be manufactured at a much lower cost and be more efficient than the conventional "hard surfaced", fragile membrane-film type tribo-materials used in tribo nanogenerators (TENGs).

FSTG designs can be used to develop a functional, large contact-area flocked fiber tribo-electric material contact surfaces tribo-coupling system including tribo-voltage signal conditioning and electrical circuitry needed to store and facilitate transfer of this harvested electrical energy into useful purposes.

There is no overall set standard for reporting tribo-electric power data. Some data are reported as "instantaneous" peak power values of complex tribo-electric wave forms. Measured power values are critically dependent upon the size of the tribo-contacting surfaces and activation frequencies. Consequently, tribo-power numbers cannot be reliably normalized to any "standard" tribo-contact area.

Herein, FSTG power generation values are reported in terms of the Capacitor Accumulated Power (CAP). CAP power values represent a well-established and accepted way of presenting electrical power data. In spite of these tribo-power reporting difficulties, some conventional tribo-systems were found to have voltage, capacitance and time constant data available for calculating tribo-power in terms CAP values. One conventional tribo-configuration involved a configuration having a flexible, hermetically sealed package containing PTFE (Teflon®) and PDMS (polydimethyl-siloxane) flat-sheet (4 cm×5 cm) rubbing surfaces. From the conventional system's data it was calculated that a CAP value power level of 40.2 nanoWatt for 20 cm2 area tribo-device was achieved. The data specifies that this polymer film tribo-couple device accumulated their 40.2 nanoWatt power over a 500-minute time span.

The Flocked Surface Tribo-electric Generator (FSTG) (also referred to as Flocked Surface Tribo-electric Charge Generator) tribo-coupling material system including polyimide and nylon flocked surfaces was surprisingly found to produce electrical power that exceeded, by almost two (2) times, the electrical power output of Nylon/PET FSTG embodiments. Furthermore, this increased power output is accomplished in an almost 1.5 times shorter charge time compared to PET/Nylon embodiments. Shorter time constants are a quantitative measure of the ease at which a system can be tribo-charged.

In contrast to conventional systems, in one embodiment of the present invention, a CAP value of 133.5 nanoWatt per 100 $cm^2$ area is obtained for the Polyimide/Nylon tribo-device. Surprisingly in a direct comparison, the CAP value for a non-optimized FSTG system is up to three (3) times higher than conventional systems. This FSTG system achieved their 133.5 nanoWatts per 100 $cm^2$ area of power accumulation in only 2.82 minutes. This is a remarkably short time compared to conventional polymer film type tribo-devices. Putting it in terms of a tribo-power creation rate, the FSTG Polyimide/Nylon tribo-couple power production rate is 47.2 nanoWatt/min while the conventional polymer film-based PTFE/PDMS system generates its power at a rate of only 0.08 nanoW/min.

The rapid power accumulation rate of FSTG systems appears to be an inherent characteristic of the high surface area of the FSTG tribo-material systems. It is well known in electrostatics that electrical charges are prone to accumulate at sharp ends corners and points of solid structures—in the case of flocked surfaces, the multitude of fiber ends can certainly be considered as electrostatically natural places for charges to accumulate.

Flocked fiber surfaces have a very high surface area compared to the flat, planar surfaces of a solid or film (e.g., the surface area of a 10 cm×10 cm square of Mylar® polyester (PET) film is 100 square centimeters). A flocked PET fiber surface is more than 10,000 times higher in surface area. Also, flocked fiber surfaces all have a multitude of fiber ends (typical flock fiber densities of 200 fibers/sq. millimeter are typical). Therefore here, there are about 20,000 fiber ends per square centimeter, and points and edges are electron accumulation zones in electro-static phenomena.

A simple way of creating a strong tribo-electric charge by pressing/rubbing/inter-meshing together two tribo-electrically different flocked fiber surfaces. By pressing and detaching flocked Nylon fiber (+ tribo-charge) and Polyester (− tribo-charge) flocked fiber surfaces together in a touch/detach (Up/Down) motion, it was found that electrical tribo-charges can be easily and reproducibly generated. The method of inter-meshing to two (upright) flocked surfaces to generate a tribo-electric charge differs from the conventional method of creating tribo-electric charges by rubbing/sliding together textile fibers. It is predicted that this simple flocked fiber arrangement will result in creating low cost, large tribo-contact area, mechanical to electrical energy conversion/generation devices of great practical utility. One potential use is as a power source for wearable electronic health monitoring devices to replace bulky, limited lifetime electrochemical batteries currently used. Other possible uses would be to convert mechanical energy created by ambulatory pedestrians, the motions of vehicles riding over bumpy terrain, or the motion of an ocean wave into electrical power. Employing FSTG technology, in principle, virtually any mode of mechanical energy-of-motion can be harnessed and converted into tribo-electric charge created mechanical to electrical energy transduction. Other applications are listed below.

Ocean Wave Energy Harvesting: It has recently been reported that tribo-electric methodology is now being studied as an effective and efficient means of harvesting of ocean wave energy. It is believed that the use of Polyimide flocked surface tribo-couple material system could indeed be used here at a much lower cost and would be more efficient, robust and durable than the conventional "hard surfaced", fragile membrane-film type tribo-materials. A multi-unit array of individual FTSG wave energy motion converting modules could be set up as a floating water-proof flexible layer, to generate power through wave action.

Military Vehicle Energy Harvesting Devices: FSTG pads can be mounted onto the frame of military vehicles to convert the mechanical energy from the random vertical bouncing and vibrations of the military (or other motor vehicle) traveling along bumpy terrain. This generated tribo-energy would be stored in the vehicle's captive storage battery (regenerative energy) whose extra energy could be used to power personal electronic devices. Relatively small size rectangular (multi-layer) stacked FSTG structures mounted on the military vehicle's (internal) structure.

"Smart Carpets": Hospital and nursing home facilities are fraught with air-borne pathogens. The condition of breathing clean, antiseptic air in these facilities is of utmost importance. It is envisioned that FSTG technology can be applied by integrating FSTG pad devices in large carpeted areas having high pedestrian traffic. These FSTG pads would be electronically designed to provide high electrostatic charge to power wall mounted, pathogen collecting air cleaning panels. A connected series of composite/layered areal pad structure with a corrugated or raised cross-section to accommodate the contact/separation of the FSTG's active tribo-layers could be used to provide electrical power to charge wall-panel electro-static dust collectors.

Now referring to FIG. 1A, an FSTG 100 is shown to illustrate the principles of FSTG operation. The FSTG includes first and second electrodes 110a and 110b, first flock fiber support layer 112 and second flock fiber support layer 124 conductively connected to respective ones of the first and second electrodes 110a and 110b, a first flock fiber material including fibers 120a-120n (collectively referred to as first flocked fibers 120 or first flocked fiber material 120) flocked onto the first flock fiber support layer 112 and a second different flock fiber material including fibers 122a-122m (collectively referred to as second flocked fibers 122 or second flocked fiber material 122) flocked onto the second flock fiber support layer 124. The first flock fiber support layer 112 and the second flock fiber support layer 124 are configured to generate electrical energy by generating friction contact between the first flock fiber material 120 and the second different flock fiber material 122 by contacting the first flock fiber material 120 to the second different flock fiber material 122 and separating the first flock fiber material 120 from the second different flock fiber material 122. The arrows 106 in FIG. 1A indicate the up/down striking motion of the flock surface tribo-charge generator (FSTG) functioning in a vertical contact-separation mode in one example embodiment.

In operation, the FSTG of FIG. 1A tribo-charges up to three volts (DC). A test instrument was constructed and rendered operational that mechanically and controllably oscillates two flocked material surfaces between a contact and separation mode. Using this test instrument, mechanically controlled, reproducible/tribo-charge FSTG signals can were measured and a signal conditioning RC circuit was developed to convert (rectify) the AC output signal to DC and store the electrical energy in a capacitor. It is understood that in some of the embodiments described below that either Polyester or Polyimide fibers can be used in combination with Nylon fibers. Prior to the operational establishment of this controlled intermittent contact/intermeshing/separation device, a means of inducing the FSTG contact/separation mode by hand action was devised. Here, aluminum sheet metal backed flocked surfaces were configured so that the needed contact/separation event of the two contacting flocked surface was manually produced by this hand motion.

In various embodiments the first and second electrodes 110a and 110b can be provided by an electrically conductive coating applied to the first and second flock fiber support layers opposite the flock fibers. In other embodiments the first and second electrodes 110a and 110b (also referred to as contact surfaces) include metal foil or metal sheets bonded to the first and second flock fiber support layers using a conductive adhesive.

Figure 7:
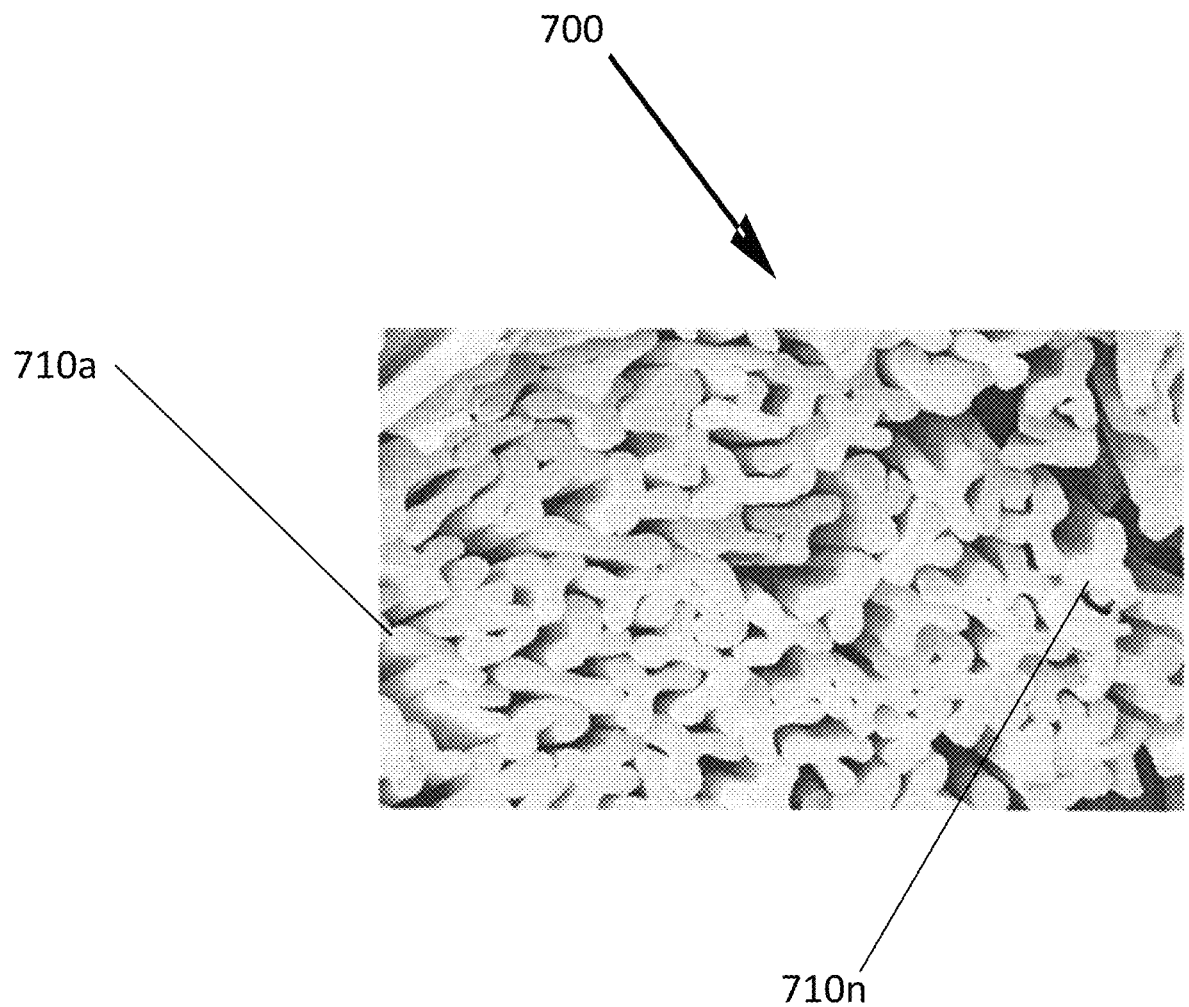
FIG. 7 is a diagram of fibers having a trilobal shape in accordance with one example embodiment disclosed herein.
Figure 8:
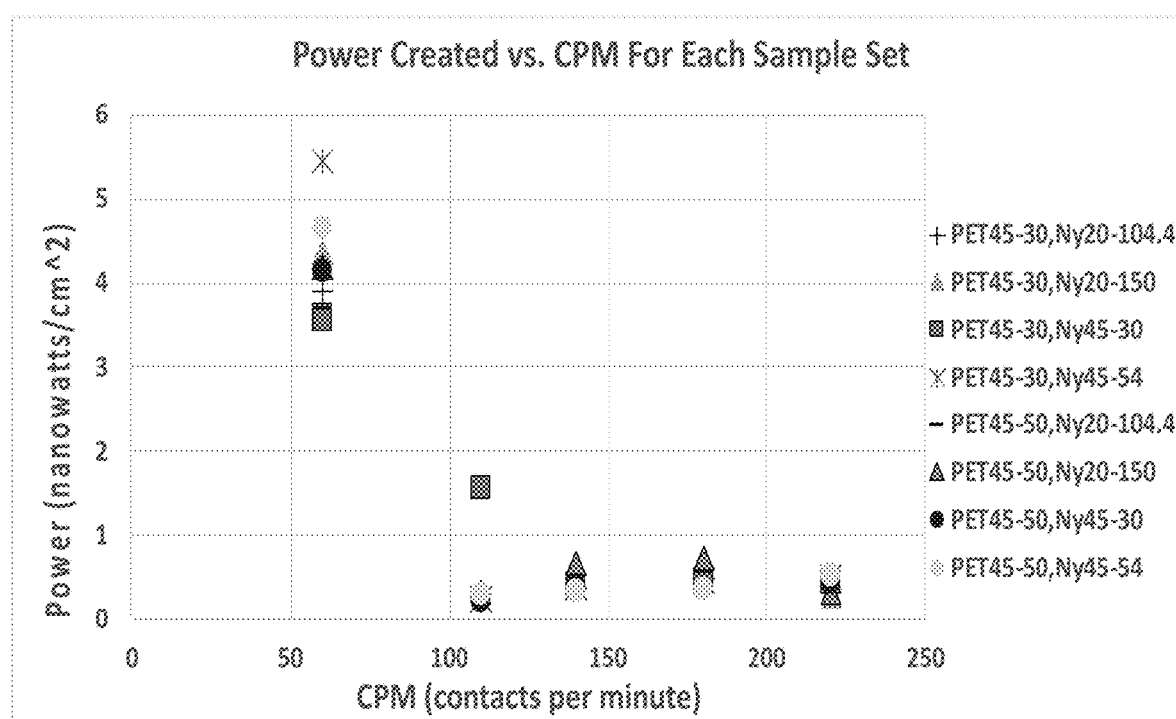
FIG. 8 is a graph showing power generated from the contact/separation action of two tribo-matched flocked fiber tribo-couplings as a function of contact/separation rate.

Experimental studies have discovered a more efficient flocked surface tribo-electric "tribo-coupling" flocked material system. In one embodiment, the Polyimide fiber (e.g., Polyimide P84® manufactured by Evonik Fibres GmbH, Austria and Parsippany, N.J.) is used in a Nylon/Polyimide coupling. It was observed that Polyimide P84® fibers individually have multi-lobal shapes, and in one embodiment the plurality of fibers individually have a trilobal shape as shown in FIG. 7. In various embodiments, the plurality of fibers individually have multi-lobal shapes, and in one embodiment the plurality of fibers individually have trilobal shape as shown in FIG. 7. The multi-lobal cross section offers up to 90% more surface area compared to conventional round fibers and is an important advantage in certain embodiments. An enhancement of the FSTG performance of the /Nylon/polyimide tribo-couple is in part caused by the increased surface area of the polyimide fiber's tri-lobal shape In certain embodiments it is possible to combine several FSTG units to establish multiple-element FSTG systems. Such a combined element system provides higher FSTG power output thereby offering a broader application profile for this FSTG technology especially in the future areas of ocean wave energy harvesting and wind turbine energy conversion power efficiency enhancers. In other embodiments, stacked double-sided flock fiber support layers are used and multiple electrodes are used to provide series, parallel and series/parallel configurations.

Some preliminary experiments were carried out whereby nylon and Polyester flock fiber surfaces were hand-slide contacted together in an attempt to determine if any tribo-electric charge could be generated. In one embodiment the following materials were used:

(1) 45 denier, 3 mm long Polyester (PET) single-side flocked onto a woven fabric. The back of the single side-flocked panel was coated with a carbon black filled electrically conducting adhesive (Creative Materials (Ayers, Mass.) Type 107-25 one package, solvent based adhesive).

(2) 45, 60 and 100 denier, 3 mm long nylon fiber flocked onto a polyester nonwoven fabric base (Tru-Grid-Pellon #806-nonwoven fabric-JoAnn Fabric). The backs of these single side flocked panels were coated with the conductive 107-25 adhesive (see above).

Figure 1B:
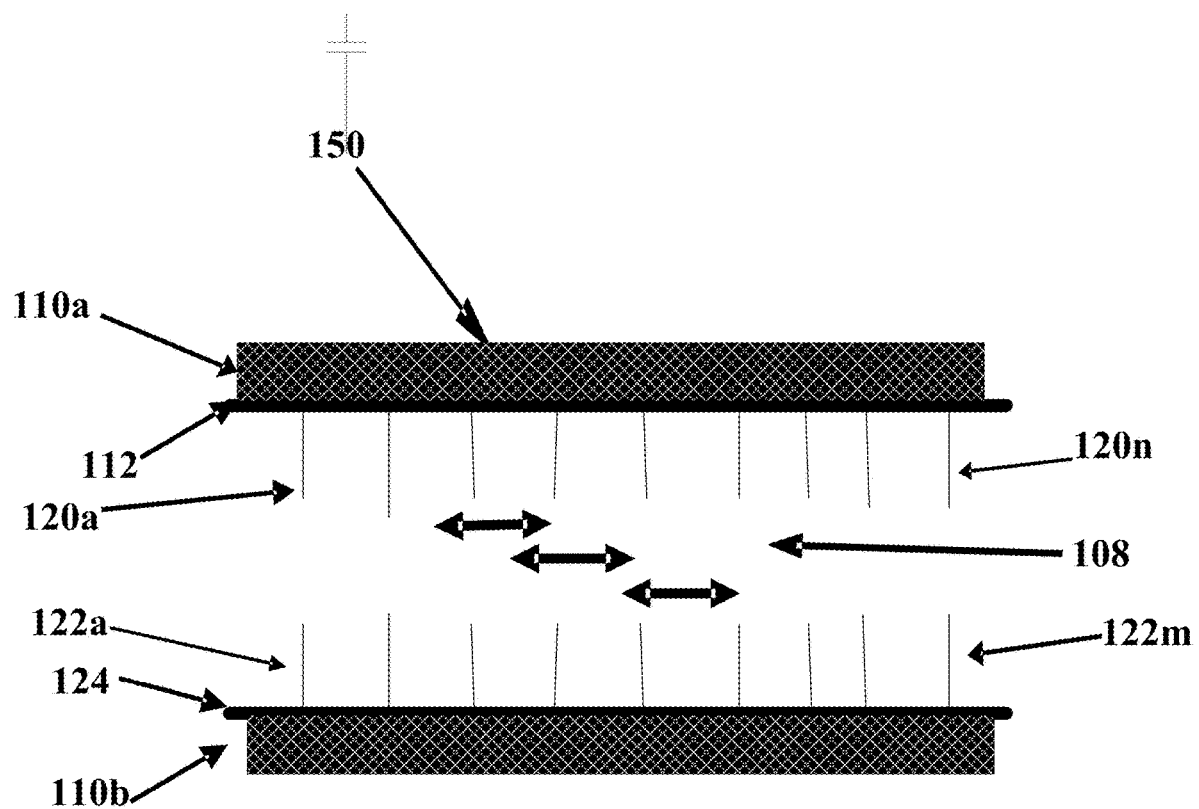
FIG. 1B is a schematic diagram of a Sliding Flocked Surface Tribo-electric nano Generator (FSTG) in accordance with one example embodiment disclosed herein.

Experimental Set-Up: The tribo-charge test sample arrangement is shown in FIG. 1B. The electric current measuring device used in these experiments was a Radio Shack, Auto-Ranging, LCD Digital Multimeter. Examples of some Multi-Meter readings obtained in these tests are presented in Table 1.

FIG. 1B is a diagram of a SLIDING Flocked Surface Tribo-electric Generator (FSTG) 150 which is similar to the FSTG 100 of FIG. 1A. Arrows 108 indicate the sliding motion of the flock fibers 120a-120n and 122a-122m.

An experiment was carried out employing the proto type material layer arrangement sketched in FIG. 1B. The approximate size of the top and bottom flocked elements was about 6.35 cm wide and 12.7 cm long. In this arrangement, the polyester flocked fabric/conductive layer part/aluminum sheet back-up assembly is placed on a clean, dry, solid flat table (a small sheet of 2.4 mm thick polycarbonate plastic was fit under the polyester flocked element/aluminum sheet for insulation purposes). With the electrodes of the Radio Shack Multi-Meter electrical property measuring instrument alligator clipped to the two flocked (and conductive) layers, the top (nylon) flocked layer was "hand" stroked against the (stationary) polyester flocked layer secured (by hand) to the flat table. The rubbing was accompanied by having the Multi-Meter turned on to the ampere (current) mode at the micro-amp scale. The forward-stroke hand rubbing procedure was then carried out. Some qualitative results of these experiments follow.

A general procedure was developed with the intent of obtaining some consistent results. The procedure is described below:

(1) Before any measurements, touch both + and − electrodes of the Multi-Meter together to "zero" the reading (discharge any stray electrons).

(2) Proceed with the arrangement of the Nylon and Polyester fibrous (and other test material) samples (ready for rubbing) as shown in FIG. 1B.

(3) Connect the Multi-Meter electrodes by alligator clips to the bottom fabric/aluminum sheet "stationary" bottom panel (e. g. fibrous polyester material layer). Note that the flocked polyester fiber surface/layer fabric is bonded to the aluminum sheet with conductive adhesive.

(4) Take the other electrode and clip it to the second fabric sheet (e. g. Nylon flocked);

(5) Make sure the alligator clip grips/is in contact with the conductive coating.

(6) Set the Multi-Meter (MM) so that it reads amperes (current) in micro-amps.

(7) Holding this top fibrous pad with fingers, with a sweeping motion, rub the top fabric (nylon) electrode (#4) against the bottom stationary (polyester material) surface. #1: These sweeps are—forward stroke—lift off surface—move back—forward stroke repeated motions. Follow the Radio Shack MM micro-amp digital read-out as the two surfaces are rubbed.

(8) The ampere reading will jump UP and Down but will intermittently drift higher and higher. Recorded these values during this stroking action. This stroke process is continued until the more or less, highest current number (micro-amperes) is observed. (very subjective)

(9) Record in the highest micro-amp number range achieved.

Experimental Results:
Flocked Surface on Flocked Surface Slide/Rubbing: Results of the tribo-charging experiments are presented in Table 1.

TABLE 1

Electro-Static Current Generation Results Obtained Using Humidity Variations of the Sliding/Rubbing FSTG Action. Hand operated sliding/rubbing FSTG action used.

| | Atmospheric Conditions (f) | Range of Micro-Amps Observed (c) |
|---|---|---|
| STATIONARY-PET Flock 45 denier, 2 mm long/ MOBILE - Nylon Flocked | | |
| 45 denier, 2 mm long | Humid | 0.063-0.082 |
| 60 denier, 3 mm long | Dry | 0.470-0.880 (e) |
| 60 denier, 3 mm long | Humid | 0.063-0.085 |
| 100 denier, 2 mm long | Humid | 0.029-0.0.046 |
| Nylon Fabric (light-weight) (d) | Dry | 0.060-0.106 |
| Nylon Fabric (light-weight) (d) | Humid | 0.008-0.013 |
| STATIONARY-100% PET Micro-Suede (fabric)/ MOBILE - Nylon Flocked Surface | | |
| 45 denier, 2 mm long | Dry | 0.330-0.400 |
| 60 denier, 3 mm long | Dry | 0.325-0.503 |
| 100 denier, 2 mm long | Dry | 0.075-0.112 |
| Nylon Fabric (light weight) (d) | Dry | 0.055-0.073 |

(a) All reported results were obtained using the 45 denier, 3 mm long Polyester Flocked conductive layer as the bottom (set on the flat table) element.
(b) In these measurements, the FIG. 1B set-up was placed on top of a 0.025" thick aluminum sheet. A 0.093" thick sheet of polycarbonate was placed on the Table surface under the FIG. 1/aluminum sheet assembly.
(c) The polarity of these present current (micro-ampere) numbers were negative (−). It was determined that if the electrodes of the Multi-Meter are reversed, this ampere number will change to positive (+). This demonstrates that the generated tribo-current is being generated by the Nylon/Polyester tribo-contact induced by the rubbing action.
(d) These light weight Nylon (not flocked) fabric (Mobile) tests were run as "Controls".
(e) This tribo-stroked panel was found to retain its charge after stroking was stopped. The charge then proceeded to drift downward slowly after stroking was stopped.
(f) Tests under "Dry" conditions were carried out immediately after the samples were dried in an oven before testing. The "humid" tests were carried out under ambient conditions (samples left to equilibrate to ambient humidity conditions before testing).

Summary and Review of Flocked Surface Tribo-electric Generator (FSTG) Device Test Results The data in Table 1 clearly show the effect that humidity (and moisture) can have on the FSTG data. This behavior is expected in the realm of tribo-electric charge measurements. From this experience, it is important that FSTG studies be carried out under controlled humidity conditions. The following conclusions can be made from the Table 1 data.

(1) FSTG current measurements are very sensitive to the moisture conditions under which the tribo-electric measurements are made.
(2) Stroking the 60 denier, 3 mm long NYLON flocked surface against the 45 denier, 2 mm long POLYESTER flocked surface under dry conditions generated the highest tribo-electric charge. This charge was also retained after stroking was stopped. The charge slowly decreased (bled off) over a period of time.
(3) It appears that the rubbing (non-flocked) Nylon fabric against (fuzzy but not flocked) Polyester (fuzzy microsuede) fabric does not achieve the tribo-electric charging potential that is observed when at least one of the rubbing surfaces is a flocked surface.

It was determined that the Vertical Contact (VCM) Mode of tribological rubbing of these flocked surfaces seemed to be more effective than the in-plane siding mode (as shown in Table 2 below). It is hypothesized that the reason for the enhance FSTG effect by the VCM of activation is because of the inter-penetration of the Nylon and Polyester flock fibers during the vertical contact of the two flocked surfaces. This suggests that perhaps flock density may have an important bearing on the performance of these FSTG systems. In continuing studies, attempts were made to measure the remnant DC voltage from the up and down (vertical) flock-on-flock contact illustrated in FIG. 4. Here, voltages of up to 400 milli-volts were recorded when the two flocked surfaces were stroked and quiescently laid to rest on top of each other. This was a surprising result—the flock-on-flock touching surfaces seemed to be acting as a battery, like an Electret Battery. This observation could be easily reproduced and the voltage reading was somewhat permanent. Confirmation of this effect was made by reversing the leads of the Multi-Meter and the polarity of the charge was reversed. This indicated that the DC voltage was indeed being generated by the differences in polarity of the Nylon and Polyester flocked surfaces. One of the flocked surfaces was serving as a reservoir of "loose" electrons. Here, the tribo-surfaces are acting as a capacitor. From the tribo-electric series it was the polyester flock fiber surfaces that were accumulating the "rubbed off" electrons.

Figure 2A:
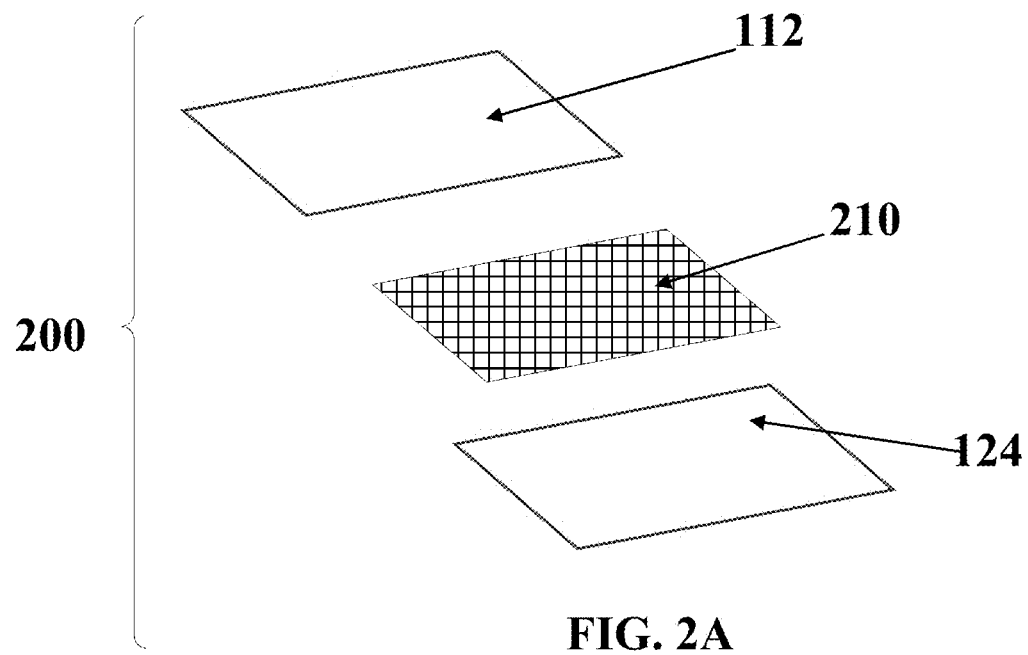
FIGS. 2A-2B are schematic diagrams of a FSTG Tribo-Charge Generating Device including an elastic spacer in accordance with one example embodiment disclosed herein.
Figure 2B:
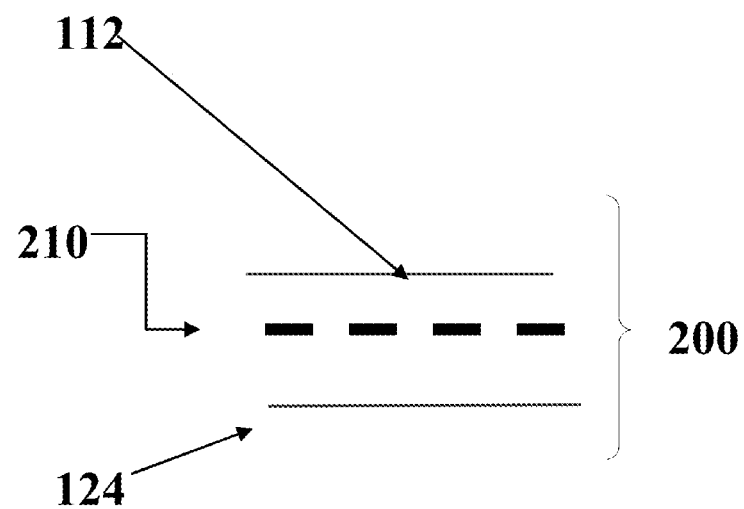

Now referring to FIGS. 2A and 2B, in another embodiment FSTG 200 similar to FSTG 100 further includes an elastic spacer 210. The elastic spacer is relatively thin compared to flock fiber length to maximize penetration. In order to have a standalone operating device in contrast to a test instrument which can pull fibers apart and push fibers together, it is necessary to keep the first and second flock fiber surfaces separated at some point in the up and down vertical contact-intermeshing/separation cycles. In one embodiment, this is accomplished by means of the electrically insulating elastic spacer 210 which in this embodiment includes a central open mesh rubbery, flexible, spacer layer. In other embodiments, the elastic spacer includes a flexible, recoverable spring which includes, but is not limited to, elastomeric foam, an elastomeric mesh and a corrugated plastic strip material The FSTG embodiment depicted in FIG. 1A shows the vertical contact and separation of two planar flocked surfaces. In another embodiment the up-down contact-separation coupling of two matched wavy surfaces or zigzag non-planar surfaces can be configured into a special FSTG unit where the application space might be confining. Here, the two contacting/intermeshing flocked layer tribo-couple surfaces each have a zigzag edge-view shape. This zigzag edge-shape has "peaks" and "valleys", high points and troughs. The arrangement here is to have the two zigzag shaped surfaces inter-mate such that the peaks of one of the tribo-material surfaces fit into the trough of the other tribo-material surface. Contact between the two tribo-surfaces is geometrically designed to fit into each other causing the surfaces of both zigzag shaped surfaces to have full contact between the two surfaces. As affected, such non-planar flocked contact surfaced FSTG units will have a slightly higher areal contact surface area that will increase the power efficiency of the so-designed FSTG unit.

In some additional feasibility experiments, it was learned that the measured tribo-voltage would increase as the static (hand) pressure contact between the two surfaces was increased. This was found to be reversible, namely, if the higher (hand) pressure was reduced, the tribo-voltage went back down in value; up the hand pressure, again, the voltage would again increase; and so forth. From the above observation the process of the up and down striking of the two-flocked surface with more vigor and strike intensity was tried. Here it was observed that under these more vigorous "contact-striking" conditions, the Flocked Surface "Tribo-Battery" was more rapidly and charged to a higher voltage. This pressure effect is a parameter that will have importance during application design studies employing FSTG modular devices.

In an effort to determine some of the material parameters that will establish an optimum AC voltage creation, several configurations were prepared and AC voltage output tested. These results are presented in Table 2. Overall, the only Nylon/Polyester couplings (N/P couplings) of interest were the ones involving the longer flocked fibers. Also, the two samples that were newly prepared for this study were the 151-D and 151-E (configurations described below). Also, of great interest is that the only sample that showed any indication that a current was flowing was the 151-D sample which also registered the highest AC voltage. For some reason too, the data show that the 45 denier nylon flocked surfaces had higher AC voltage production than the 60 denier flocked nylon surface. Surprisingly, the N/P tribo-couple that showed the least FSTG voltage action were the N/P tribo-couplings have at least one short flock fiber component, 151-C, 152-A and 152-B.

TABLE 2

AC Tribo-Voltages Generated by Various Nylon/PET Strike Configurations. Hand operated Up and Down FSTG action used.

| Lab ID | Nylon Flocked Surface + | Polyester (PET) Flocked Surface − | Maximum AC Voltage (Volts) (a) |
|---|---|---|---|
| 151-A (b) | 60 denier, 3 mm long | 60 denier, 3 mm long | 1.3 to 1.5 |
| 151-B | Same at 151-A | 60 denier, 3 mm long/ 1/8" thick butyl Rubber layer | 0.2 to 0.4 |
| 151-C | 6 denier, 1 mm long | 45 denier, 1.2 mm long flocked on conductive fabric. | 0.6 to 0.8 |
| 151-D (c) | 45 denier, 3 mm long | Same as 151-A | 3.7 to 4.7 |
| 152-E | 60 denier, 3 mm long | Same as 151-A | 3.3 to 3.4 |
| 152-A | 45 denier, 3 mm long | Same as 151-C | 0.6 to 0.7 |
| 152-B | 60 denier, 3 mm long | Same as 151-C | 0.3 to 0.8 |

(a) This is the approximate AC voltage range achieved when the Nylon/PET tribo-surfaces are vigorously struck together 40 to 50 times.
(b) This is the first N/P tribo-couple that was prepared in May 2017. This device is pictured in FIG. A2-1.
(c) This was the only N/P tribo-coupling where a very low current was observed 0.1 micro-amps was observed (with no resistor in circuit).

Waveform patterns of strike pulses (successive (down/up) strikes of the flocked surfaces) clearly show an AC voltage for each pulse. Regarding the effect of "strike intensity,"

recorded on these tracings is also the peak to peak voltage value that was obtained in each run. As measured, the higher the intensity of the strike, the higher the peak-to-peak voltage. Hand powered FSTG experiments were carried out to determine if these AC FSTG voltages could be store in a simple electrolytic capacitor. Here an experimental set-up was put together as shown in Figure A2.7. In the capacitor charging step, the FSTG device was moderately stroked for about 40-50 times where an AC voltage of about 2.1 volts was registered. The charge that was stored in the circuit's capacitor was then measured on the Multi Meter as a DC voltage. The measured DC voltage was about 60 to 62 millivolts, this voltage was found to drift slowly downward due to the "leaking" of the voltage from the capacitor. As a check on whether this observed voltage storage event was real, the electrode polarity from the capacitor was reversed causing the polarity of the stored DC voltage to be reversed. This was considered proof that the FSTG AC voltage output can indeed be stored in a capacitor device.

Additional capacitor experiments were carried out using various micro farad sizes of electrolytic capacitors. The results of these capacitor experiments are presented in Table 3. These data show that tribo-charges generated by an FSTG can indeed be accumulated in an electronic capacitor. It is believed that the charge is real since the polarity of the stored voltage can be reversed by reversing the measurement electrodes.

TABLE 3

Voltage Accumulated During the "Strike Up and Down-Charging" of Flocked Nylon Against Flocked PET Fiber surfaces.

| Capacitance of Condenser Used (Micro Farads) | Number of Consecutive Hand Strikes of the Flocked Surfaces. | Capacitor Stored Electrical Energy (a) (b) (DC Volts) |
|---|---|---|
| 4.7 | 100 | 0.604 |
| 4.7 | 200 | 0.662 |
| 10.0 | 100 | 0.503 |
| 10.0 | 200 | 0.610 |
| 10.0 | 400 | 0.669 |
| 10.0 | 800 | 0.699 |
| 470 | 100 | 0.014 (c) |
| 470 | 200 | 0.069 |
| 470 | 400 | 0.138 |

(a) In all cases, the reported results are the maximum voltage reading
(b) In all cases, these maximum voltage numbers would drift downward during the measurement; rapidly at first slowing down when the voltage got into the 350 millivolt range.
(c) The drift downward of the voltage for this capacitor was quite slow. Much slower than for the lower capacitance condensers.

Figure 3:
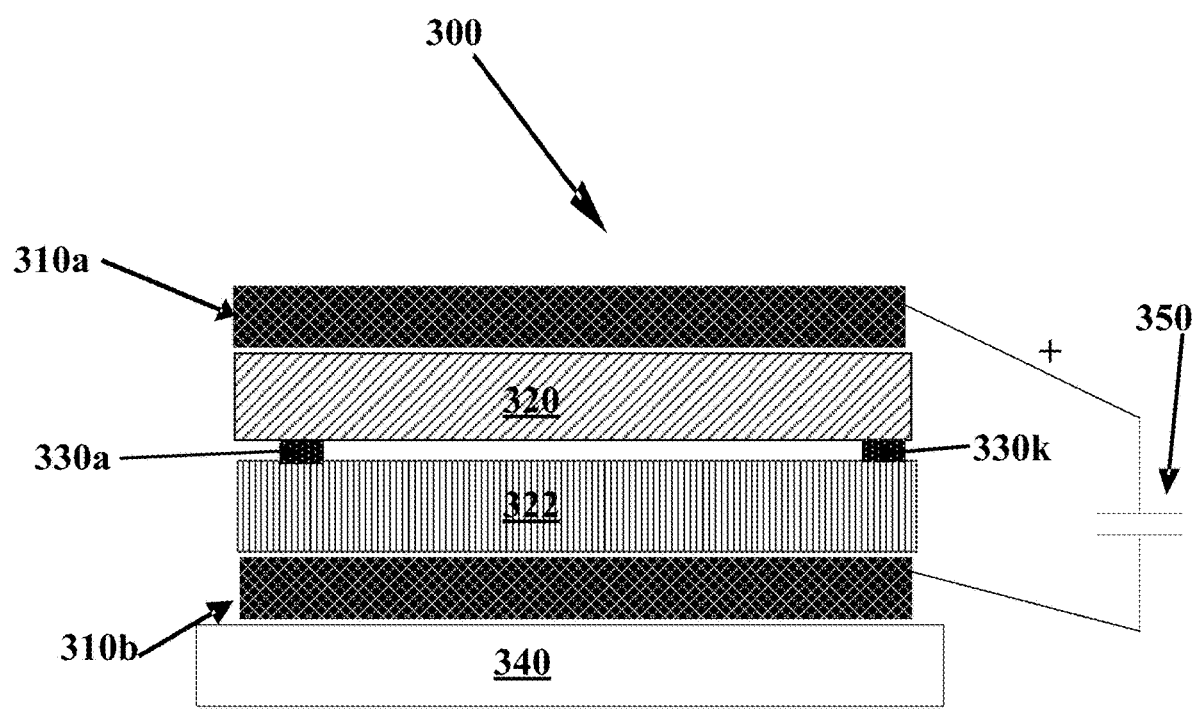
FIG. 3 is a schematic diagram of a FSTG including an elastic spacer in accordance with one example embodiment disclosed herein.

From the combined observations in these experiments, it was concluded that the FSTG device pictured in FIG. 3 was functioning as an electrical capacitor. Electrical energy was being stored in the flocked surface. The key observations allowing one to make this conclusion were:

The electrical current measurements made on the FSTG device could only be made when the Nylon flocked surface was completely separated from PET flocked fiber surface. This is a characteristic of what is called a self-capacitor. Self-capacitance occurs in isolated conductors. For example, the self-capacitance, C, of conductive sphere is given by the Equation, $$C=q/V$$

Where q is the charge held by the conductor and V is the voltage stored in the capacitor. For a spherical conductor, the capacitance is, $$C=4\pi\varepsilon_o R$$

where $\varepsilon_o$ is an electrical constant (8.854×10-12 F·m−1) and R is the sphere's radius. For example, the capacitance of the top (spherical conductor) of a van de Graaff generator of 20 cm radius is typically 22.24 Pf (picofarads).

When the FSTG device is functioning as a Tribo-Battery (i.e., a capacitor) and voltage is measured, the nylon flocked surface and the PET fiber flocked surface is in contact with each other. It is known that the energy stored in a capacitor is equal to the work require to 'push' the charges into the capacitor. The work done in charging was determined as follows:

$$Wc=\tfrac{1}{2}(CV^2)$$

It was determined that the FSTG device can function as a capacitor. Overall, the various measurements presented in this document show that the FSTG devices can function as both an energy storage and an energy output device. The maximum energy storage and output of the device will depend upon the maximum charge density on the flocked fiber's dielectric surface. The maximum charge density is directly related to the capacitance of the device. For example, one would expect that higher capacitance flocked surfaces could be achieved by increasing the length of the flock fiber used. Note: only a single length (and denier) flock fiber (3 mm) was used to construct the Figure A2-3 device. Also, an increase in surface area of the flocked surface should also increase the capacitance of the flocked surface. Very high surface area flocked surfaces can be prepared by: (1) Increasing the flock density of the deposited flock and (2) Flocking Multi-component flock fibers (nylon-"sea" and PET "island") onto a surface and dissolving out the nylon to leave very high surface area PET (ultra-high surface area-micro/nano-fibers).

Now referring to FIG. 3, an FSTG 300 includes first and second electrodes 310a and 310b, first flock fiber support layer with first flock fiber material including fibers (collectively referred to as first flock layer 320) conductively connected to the first electrode 310a and second flock fiber support layer with second different flock fiber material including fibers (collectively referred to as second flock layer 322) conductively connected to the first electrode. The FSTG 300 further includes a plurality of spacers 330a and 330k disposed between the first flock layer 320 and the second flock layer 322.

The FSTG 300 optionally includes a solid support base 340 and can be coupled to an external capacitor 350 for storage of electrical energy. In one embodiment, the plurality of spacers 330a-330k (collectively referred to as spacers 330) are insulated spring or elastic spacer material (e.g. flexible, spring-recoverable foam material) disposed between Polyester and Nylon flocked surfaces to keep them separated between activating cyclic compressions by touch, striking or step motion, for example. In this embodiment the first and second electrodes 310a and 310b are conductive metal sheet material (e.g., 1/16" aluminum) and the first flock layer 320 includes Nylon fibers flocked onto a dielectric (non-conducting nonwoven base and the second flock layer 322 includes Polyester fibers flocked onto a dielectric (non-conducting nonwoven base). It is understood, that in some embodiment it is possible to use a single spacer.

The spacers 330, in one embodiment are thin insulating flexible spacer used to improve the voltage generating power of the FSTG 300. In operation, the flocked surfaces are normally totally separated (by a narrow space) by a thin compression-ally resilient electrically insulating foam or otherwise "springy" material. In one embodiment, the springy foam material was polyurethane memory foam (2.9 mm thick and 2.7 mm wide) Poron® XRD 15118-65. Two of these thin Foam Spacers were positioned on each side of the PET flocked surface (spanning the flocked PET surface by about 8.9 cm 5.6 cm wide). In various embodiments the elastic spacer could be in various forms such as thin rods, flat strips, grids or dots to ensure the separation between the positive and negative flocked tribo-surfaces. In these embodiments the elastic spacer can be selectively positioned. The elastic spacer elements in these FSTG coupling are positioned so that the maximum flock surface to flock surface area is achieved when the two planar layers of the FSTG unit are pressed together and released or spring-separated.

Upon hammer striking the top Nylon flocked aluminum sheet 10 to 20 times; a voltage of 3.4 volts was generated. Additionally, several alternative spacer configurations are possible for FSTG 300:
  (a) The compression-ally resilient foam strips could be permanently fixed to the two flocked surfaces to complete the FSTG structure. This could be done using a hot melt adhesive for example.
  (b) The "spacer material arrangement" could be of different geometry—very open, thin square or triangular hole perforated layers could be used in place of the thin strips of spacer material.
  (c) Additionally, the spacer material could be positioned away from the actual flocked surface (so long as the flocked surfaces are not physically touching). This arrangement is shown in FIG. 4.

Figure 4:
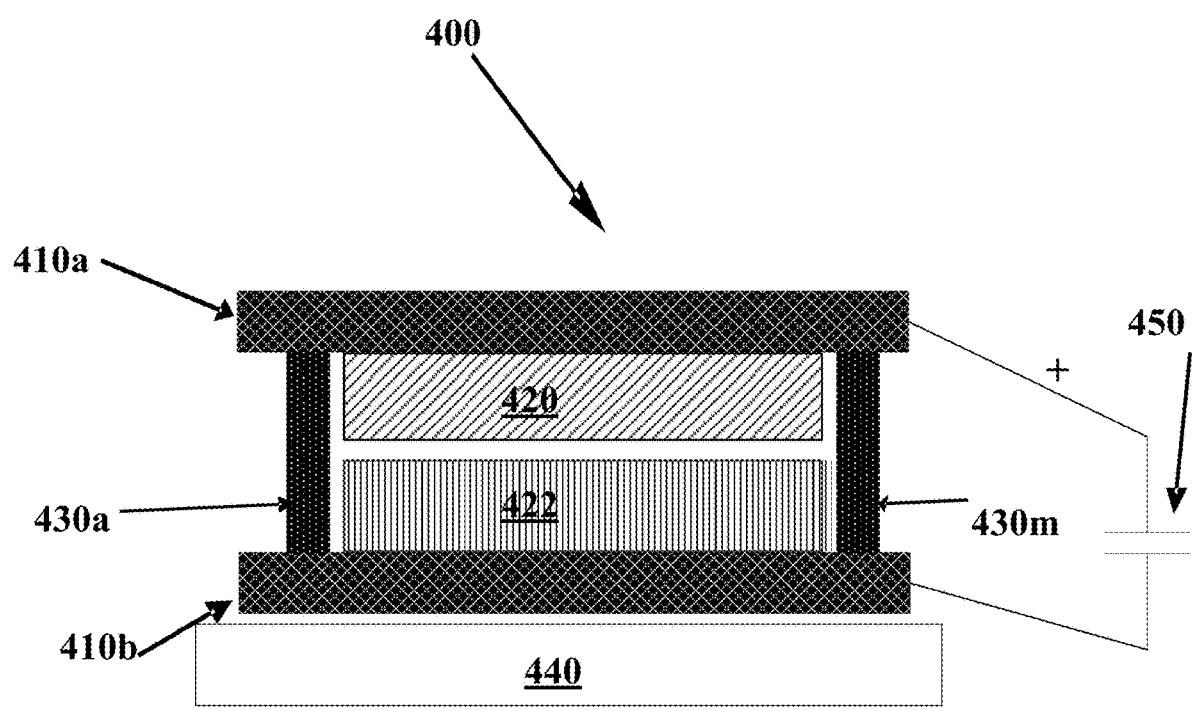
FIG. 4 is a schematic diagram of an alternate external spacer FSTG of FIG. 3.

Now referring to FIG. 4, an alternate FSTG 400, similar to FSTG 300 includes a different spacer arrangement. FSTG 400 includes a plurality of spacers 430a-430m (collectively referred to as spacers 430) which are disposed between first and second electrodes 410a and 410b without directly separating the first flock layer 420 and the second flock layer 422. In one embodiment the spacer 430 in an insulated Spring (divider) material (e.g. reticulated foam) set between the first and second electrodes 410a and 410b to keep the polyester second flock layer 422 and nylon first flock layer 420 flocked surfaces separated between activating cyclic (touch) compressions.

The basic principle of all the FSTG embodiments 300 and 400 of FIG. 3 and FIG. 4 involves a means of inducing sequential contact/non-contact functional vertical contact of a Nylon fiber flocked Surface (or any+flocked material tribo-surface) against a Polyester fiber flocked surface (or any–flocked material tribo-flocked surface). Here, the two flocked surfaces are kept separated by (electrically insulated) spring-like spacer material. When random and intermittent (strike or contact) pressure is applied to the top surface of this "cell", the two flocked surfaces will touch and intermesh and then separate. Spring-back of this intermittent touching/intermeshing contact between the two flocked surfaces causes the un-touching and then contact of the flocked surfaces. Open space fills the zone between the two flocked surfaces. The device is the available for another compression touching strike and contact of the flocked surfaces. In this sequence, a tribo-charge will be accumulated within the FSTG itself and will also be accumulated in an energy storage device (small storage battery or electrical capacitor) for later use.

Figure 5:
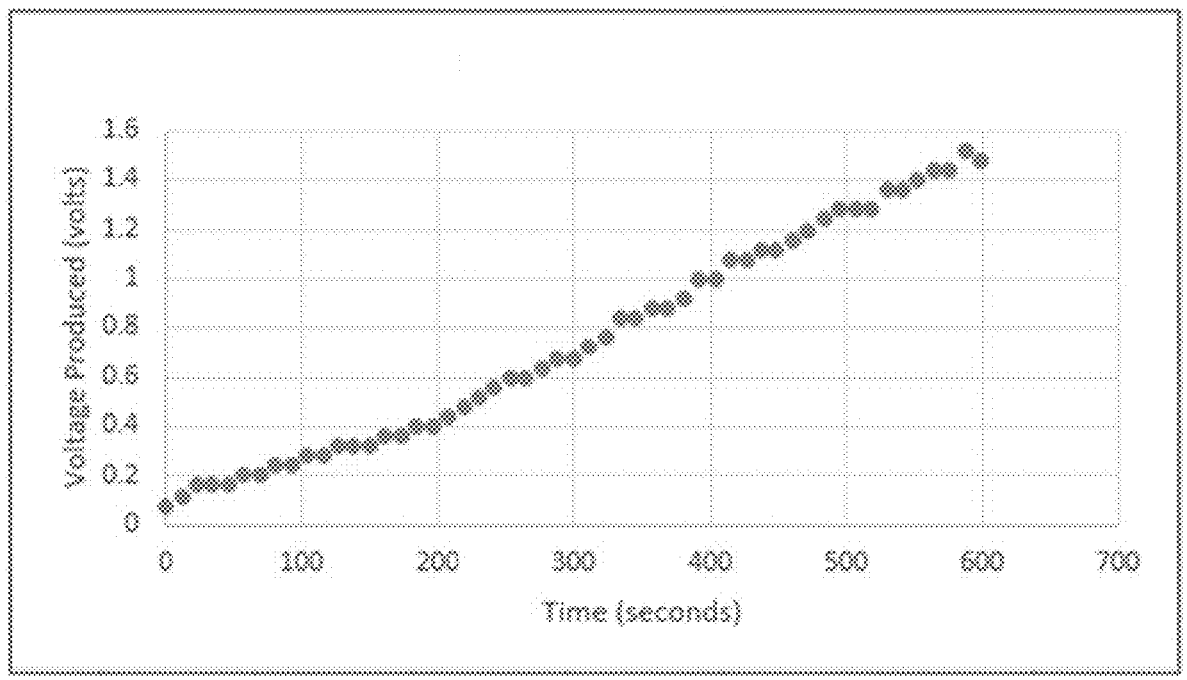
FIG. 5 is a diagram of the DC Voltage Stored in the 100 uF Capacitor as a Function of time at 1850 contacts per minute (CPM), having an FSTG Configuration of 45 Denier, 2 mm long Nylon and PET Flocked Surfaces in accordance with one example embodiment disclosed herein.

FSTG test results for 45 Denier, 2 mm long PET and Nylon Flock Fiber Surfaces at 1850 Contacts per Minute are shown in FIG. 5 In order to have a substantial and consistent DC voltage vs. time curve created, a flocked Surface Cyclic Contactor (FSCC) test apparatus was utilized for 10 minutes (600 seconds) while running at 1850 contacts per minute (cpm). FIG. 5 shows the DC Voltage Stored in the 100 uF Capacitor as a Function of Time at 1850 CPM. FSTG Configuration is 45 Denier, 2 mm long Nylon and PET Flocked Surfaces (equivalent to number of contacts; here one second equals 30.8 contacts). Reviewing the FIG. 5 data, it is observed that the voltage increase somewhat linearly with time (equivalent to number of "contacts") approximates linearity. Assuming linearity, one calculates that the rate of FSTG combination charging is about 8.1× 10-5 volts/contact cycle.

Figure 6:
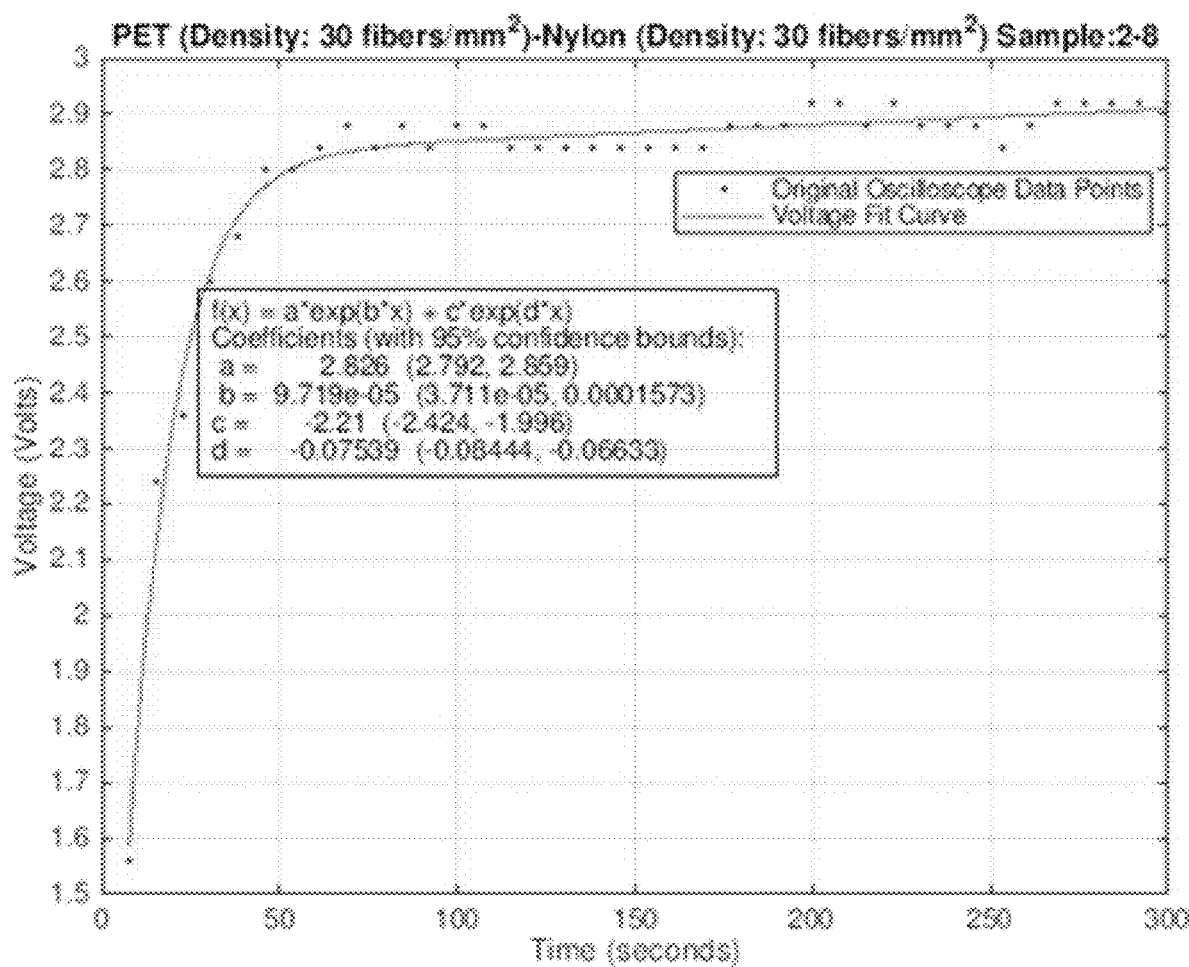
FIG. 6 is a diagram of the DC Voltage Stored in the 100 uF Capacitor as a Function of Time at 60 CPM, having an FSTG Configuration of 45 Denier, 2 mm long Nylon and PET Flocked Surfaces in accordance with one example embodiment disclosed herein.

Now referring to FIG. 6, a graph 600 shows typical voltage vs. time RC circuit capacitor charge behavior of a PET/Nylon FSTG system. The flocked Surface Cyclic Contactor (FSCC) used to obtain these data at 60 Cycles per Minute contact/separation rate. It is believed that by discretely selecting tribo-fiber material types, configured in a more electronically designed sample/material system, that power values in the milli-watt/cm$^2$ range can be easily generated.

In another series of experiments, the voltage/contact cycle increase parameter was measured at 10, 25, 35 and 50 contacts per minute (cpm) strike rate.

TABLE 4

FSTG DC Voltage (millivolts DC) Generation per Contact Cycle for 45 Denier, 2 mm long Nylon Voltage Generation by PET Contacting Flocked Surfaces at Various Contact//Separation Rates. All 100 uF Capacitor Storage Circuit

| Time | CPM | | | |
|---|---|---|---|---|
| (minutes) | 10 | 25 | 35 | 50 |
| 1 | 3.70 | 2.28 | 3.50 | 4.06 |
| 2 | 3.04 | 2.60 | 3.34 | 3.75 |
| 3 | 3.27 | 2.61 | 3.19 | 3.27 |
| 4 | 3.10 | 2.56 | 3.09 | 3.22 |
| 5 | 2.96 | 2.54 | 2.99 | 3.07 |
| Average | 3.24 ± 0.29 | 2.51 ± 0.14 | 3.22 ± 0.20 | 3.47 ± 0.42 |

(a) All voltage data measured using a Multi-Meter and a rectified AC signal.
(b) All data taken using a controlled contact sequencing device.

Table 4 summarizes data for the same 45 denier, 2 mm long Nylon/PET FSTG element configuration as the data in FIG. 5. A simple electrical circuit was assembled to measure the AC electrical signal that is generated by the contact of the PET and Nylon flocked surfaces. This AC signal is first rectified to DC and then stored in a 100 uF capacitor where the generated DC voltage is read as a function of contact number by a Tektronix oscilloscope. The FSCC apparatus was tested using 45 denier, 3 mm long PET and Nylon flocked surfaces at a condition of 1850 contacts per minute and was found to generate consistent voltage data.

It has been discovered that a flocked Polyimide surface (coupled with a nylon flocked surface) is a decisively better tribo-electric power generating surface than flocked polyester (PET) fiber surfaces. Furthermore, the time constant (time required to fully charge the tribo-couple capacitor system) is found to be much shorter than for the Nylon/PET (flocked) tribo-couple system. Both of these properties are important to establishing the commercial viability of the FSTG concept.

Other FSTG embodiments include the following configurations:
  (A) Polyimide against 45 Denier, 2 mm long Nylon Flock (flock density=30 fibers/mm$^2$ for the Nylon)
  (B) 45 Denier, 2 mm long PET against 45 Denier, 2 mm long Nylon Flock (flock density=30 fibers/mm$^2$ for both PET and Nylon)

(C) 45 Denier, 2 mm long PET (flock density=50 fibers/mm$^2$) against 45 Denier, 2 mm long Nylon (flock density=30 fibers/mm$^2$)

In another embodiment, a portion of the first flock fiber material or the second different flock fiber material are post-coated with either a poly tetrafluoro ethylene (PTFE) finish or a polydimethoxysiloxane (PDMS) (silicone) finish. In this embodiment, flock fibers on an already prepared flocked surface are coated with a robust textile finish to obtain some unique and important tribo-electric series behaving fibers. It would be difficult to flock some Teflon® Fibers (if they existed) onto a surface. In this embodiment, a Teflon® (PTFE) finish is applied to the fibers (e.g., PET fibers) of a flocked surface. This structure provides a super negative propensity flocked surface (see tribo-series list above).

It is understood that although the embodiments described herein relate specifically to flocked surface tribo-electric charge generators, the principles, practice and designs described herein are also useful in other applications. All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way. While the present invention has been described in conjunction with various embodiments and examples, it is not intended that the present teachings be limited to such embodiments or examples. On the contrary, the present invention encompasses various alternatives, modifications, and equivalents, as will be appreciated by those of skill in the art. While the teachings have been particularly shown and described with reference to specific illustrative embodiments, it should be understood that various changes in form and detail may be made without departing from the spirit and scope of the teachings. Therefore, all embodiments that come within the scope and spirit of the teachings, and equivalents thereto are claimed. The descriptions and diagrams of the methods of the present teachings should not be read as limited to the described order of elements unless stated to that effect.

The claims should not be read as limited to the described order or elements unless stated to that effect. It should be understood that various changes in form and detail may be made without departing from the scope of the appended claims. Therefore, all embodiments that come within the scope and spirit of the following claims and equivalents thereto are claimed.

We claim:

1. A flocked surface tribo-electric generator comprising:
   first and second electrodes;
   first and second flock fiber support layers conductively connected to respective ones of the first and second electrodes;
   a first flock fiber material flocked onto the first flock fiber support layer;
   a second different flock fiber material flocked onto the second flock fiber support layer; and
   wherein the first flock fiber support layer and the second flock fiber support layer are configured to generate electrical energy by generating frictional contact between the first flock fiber material and the second different flock fiber material by contacting the first flock fiber material to the second different flock fiber material and separating the first flock fiber material from the second different flock fiber material; and
   wherein at least one of the first flock fiber material and the second different flock fiber material comprises a plurality of fibers having a fiber denier in a range of about 0.5 to about 200 denier, a fiber length of about 0.5 mm to about 5 mm, and a fiber flock areal density of about 5 fibers/mm$^2$ to about 300 fibers/mm$^2$.

2. The flocked surface tribo-electric generator of claim 1 further comprising at least one open mesh, insulating elastic spacer disposed for cyclically separating the first flock fiber material and second different flock fiber material.

3. The flocked surface tribo-electric generator of claim 2 wherein the at least one elastic spacer is disposed between the first flock fiber material and the second different flock fiber material.

4. The flocked surface tribo-electric generator of claim 2 wherein the at least one elastic spacer is disposed adjacent the first electrode and the second electrode.

5. The flocked surface tribo-electric generator of claim 2 further wherein the at least one elastic spacer comprises a flexible, recoverable spring.

6. The flocked surface tribo-electric generator of claim 5 further wherein the flexible, recoverable spring comprises at least one of:
   an elastomeric foam;
   a reticulated foam structure;
   an elastomeric mesh;
   and a corrugated plastic strip material.

7. The flocked surface tribo-electric generator of claim 1, wherein the first flock fiber material includes flock fiber material having a more positive tribo-electric charge propensity rated position in a tribo-electric series than the second different flock fiber material in the tribo-electric series of textile fibers.

8. The flocked surface tribo-electric generator of claim 7, wherein a more positive tribo-electric charge propensity in the tribo-electric series flock fibers includes Nylon flock fibers and the second different flock fiber material in the tribo-electric series of flock fibers includes one of Polyethylene terephthalate (PET) fibers and polyimide fibers.

9. The flocked surface tribo-electric generator of claim 1, wherein the contacting and separating is substantially in a horizontal plane parallel to a surface of the first and second flock fiber support layers.

10. The flocked surface tribo-electric generator of claim 1, wherein the contacting and separating are substantially in a vertical plane perpendicular to flocked surfaces of the first and second flock fiber support layers.

11. The flocked surface tribo-electric generator of claim 1, wherein at least one of the first flock fiber material and the second different flock fiber material comprises a plurality of fibers having a multi-lobal shape.

12. The flocked surface tribo-electric generator of claim 1 wherein the first and second flock fiber support layers comprise at least one of:
   a polyester woven fabric;
   a Polyimide woven fabric;
   a thin polymeric film;
   a thin polymeric film coated fabric;
   a thin nonwoven fabric;
   a foam layer;
   a knitted fabric;
   a woven fabric;

warp knitted fabric (WKF);
a polyester WKF;
a Polyimide WKF;
a Weft knitted fabric;
a para-polyaramid fabric;
a meta-polyaramid fabric;
a glass fabric;
a polybenzimidazole (PBI) fabric; and
a felt layer.

13. The flocked surface tribo-electric generator of claim 1 wherein one of the first and second flock fiber support layers comprises a nonwoven dielectric fabric.

14. The flocked surface tribo-electric generator of claim 1 wherein a portion of one of the first flock fiber material and the second different flock fiber material are post-coated with one of:
a polytetrafluoroethylene (PTFE) finish;
a silicone finish;
polydimethoxysiloxane (PDMS) finish;
a polyimide resin finish;
a polyester (PET) resin finish;
a styrene and polystyrene resin finish;
an acrylic finish;
a polymethylmethacrylate (PMMA) resin finish;
a Nylon resin finish;
a polyurethane resin finish; and
a polydimethoxysiloxane (PDMS) (silicone) finish.

15. The flocked surface tribo-electric generator of claim 1, wherein the first and second electrodes comprise electrodes including one of:
a conductive fabric;
a conductive film;
a conductive plate; and
a conductive composite membrane.

16. A method of generating energy from a flocked surface tribo-electric generator comprising:
providing a flocked surface tribo-electric generator comprising:
first and second electrodes;
first and second flock fiber support layers conductively connected to respective ones of the first and second electrodes;
a first flock fiber material flocked onto the first flock fiber support layer;
a second different flock fiber material flocked onto the second flock fiber support layer; and
generating a tribo-electric charge by:
intermeshing the first flock fiber material and the second different flock fiber material;
separating the first flock fiber material from the second different flock fiber material;
wherein, the intermeshing and separating are substantially in a vertical plane perpendicular to flocked surfaces of the first and second flock fiber support layers; and
wherein at least one of the first flock fiber material and the second different flock fiber material comprises a plurality of fibers having a fiber denier in a range of about 0.5 to about 200 denier, a fiber length of about 0.5 mm to about 5 mm, and a fiber flock areal density of about 5 fibers/mm$^2$ to about 300 fibers/mm$^2$.

17. The method of generating energy of claim 16, further comprising storing the tribo-electric charge in an energy storage device.

18. The method of generating energy of claim 16, wherein the flocked surface tribo-electric generator further comprises an elastic spacer disposed to separate the first flock fiber material from the second different flock fiber material;
the method further comprises applying a force to at least one of the first and second flock fiber support layers to compress the elastic spacer while intermeshing the first flock fiber material and the second different flock fiber material; and
removing the force to allow the elastic spacer to separate the first flock fiber material and the second different flock fiber material.

19. The method of generating energy of claim 16, wherein the first flock fiber material inter-meshes or penetrates the second different flock fiber material from 1% to 98% of the length of the flocked fibers of flocked fiber materials before the first and second different flock fiber materials are separated.

* * * * *